Figures 1, 4:
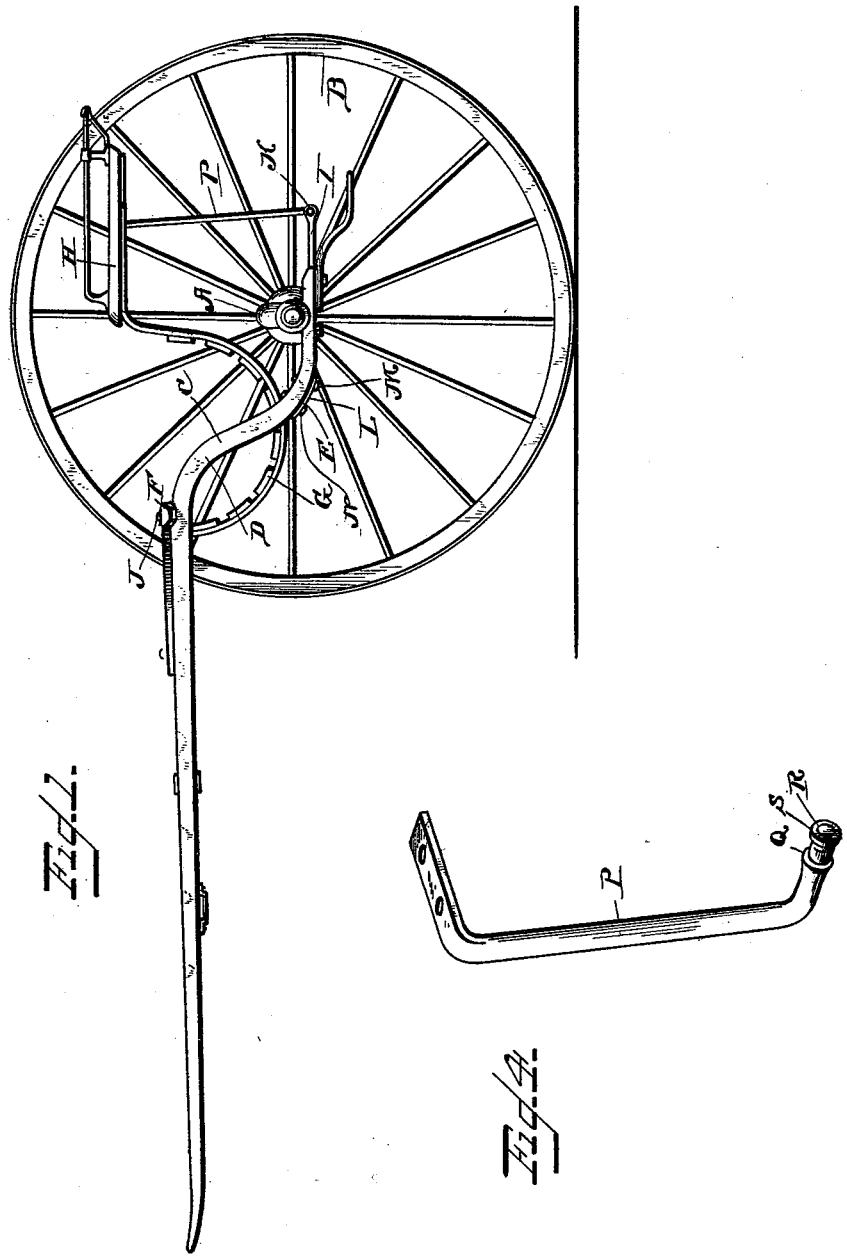

(No Model.) 2 Sheets—Sheet 1.
A. F. SHULER.
TWO WHEELED VEHICLE.

No. 394,515. Patented Dec. 11, 1888.

WITNESSES,
F. L. Ourand
Benj. E. Coer.

INVENTOR,
Andrew F. Shuler,
by Louis Bagger & Co.
Attorneys.

(No Model.)  2 Sheets—Sheet 2.
A. F. SHULER.
TWO WHEELED VEHICLE.
No. 394,515.  Patented Dec. 11, 1888.
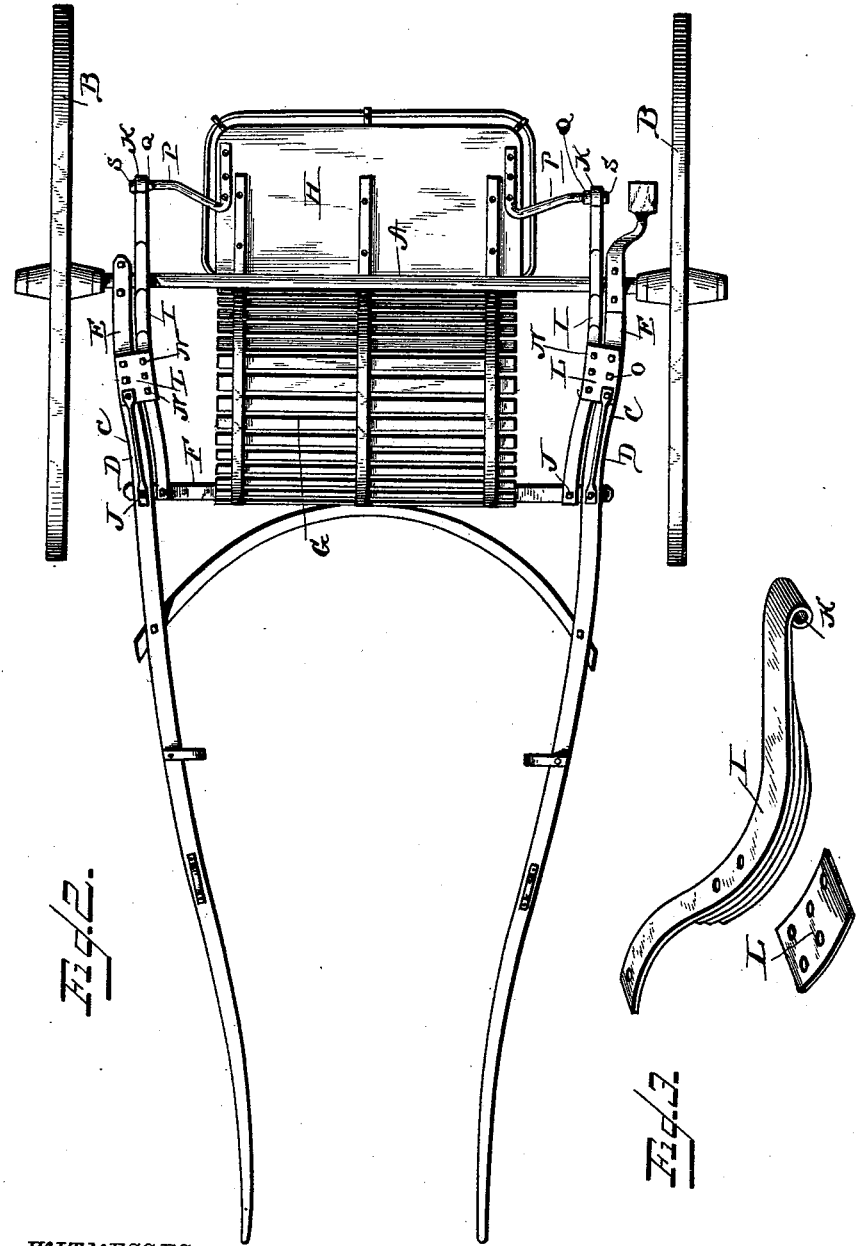
WITNESSES.
INVENTOR.

UNITED STATES PATENT OFFICE.

ANDREW F. SHULER, OF ARCANUM, OHIO.

TWO-WHEELED VEHICLE.

SPECIFICATION forming part of Letters Patent No. 394,515, dated December 11, 1888.

Application filed April 11, 1888. Serial No. 270,320. (No model.)

*To all whom it may concern:*

Be it known that I, ANDREW F. SHULER, a citizen of the United States, and a resident of Arcanum, in the county of Darke and State of Ohio, have invented certain new and useful Improvements in Two-Wheeled Vehicles; and I do hereby declare that the following is a full, clear, and exact description of the invention, which will enable others skilled in the art to which it appertains to make and use the same, reference being had to the accompanying drawings, which form a part of this specification, and in which—

Figure 1 is a side view of my new and improved two-wheel vehicle with one of the wheels removed to more clearly illustrate the character of my invention. Fig. 2 is a bottom plan view of the same. Fig. 3 is a detail perspective view of the spring, and Fig. 4 is a similar view of the seat-support.

Similar letters of reference denote corresponding parts in the several figures.

My invention has relation to that class of vehicles known as "two-wheel vehicles;" and it has for its object to construct a vehicle that will possess ease, lightness, durability, and at the same time present a fine appearance.

To this end my invention consists in the improved construction and combination of parts of the same, as will be hereinafter more fully set forth.

In the accompanying drawings, the letter A denotes the axle of the vehicle, which is mounted upon suitable wheels, B.

C denotes the thills, formed at their rear ends with a compound curve, D and E, and are connected to the axle by the ordinary clips. These thills are connected and braced forward of the axle by the cross-bar F.

G indicates the slatted foot-rest or bottom of the vehicle, which is secured with its forward end to the cross-bar F and curves downwardly and then upwardly, and is secured at that end, in the usual manner, to the seat H, which is supported in the manner hereinafter fully described.

Arranged on the inner sides of the thills are two springs, I, which are secured with their forward ends by means of bolts J to the cross-bar F, while with their other ends they project rearward beneath and beyond the axles and are formed with the transverse eyes K. These springs are constructed with the ordinary spring-leaves and are curved in substantially the same manner as the thills, thus giving a greater amount of elasticity, and at the same time enabling the body of the vehicle to be considerably lower, making it easier in getting in and out than if the springs and thills were not thus curved, which would necessitate the employment of larger wheels, and consequently a higher axle, thereby elevating the body of the carriage to such a height that it would be very inconvenient and troublesome in getting in and out, and especially so for ladies, as is obvious.

Secured to the under sides of the thills, near their rear ends, are two slightly-curved metallic blocks, L, formed with a series of apertures near each of their longitudinal edges, and through the outer series of which pass the bolts M, formed with lower screw-threaded ends, upon which are screwed the tightening-nuts N, while through the other series of apertures are passed the bolts O, similarly threaded and provided as the other bolts. It will be seen that by these bolts, which extend, respectively, through the thills and through the springs, the said slightly-curved block is firmly secured to each of the thills and springs, and that by this connection the tension of the springs is stiffened, as will be readily understood by referring to the accompanying drawings.

P denotes the curved seat-supports, which are secured at their upper ends to the under side of the seat and project downward, and are formed with shoulders or collars Q and the screw-threaded extensions R upon their outwardly-curved ends. These supports are secured with their threaded extensions in the transverse eyes formed at the rear ends of the springs, which ends I will term, for convenience of reference, the "spring-extensions," with their shoulders bearing against the inner edge of the eyes, and nuts S are screwed upon the threaded extensions, thus securing the said seat-supports to the spring-extension.

If desired, I may extend the springs forward only to the forward edge of the metallic blocks without departing from the spirit of my invention in the least.

In use it will be seen that should the wheels come suddenly in contact with a stone, or should the vehicle be traveling over uneven ground, the jar or jerk so incident to vehicles is obviated by the peculiar manner in which the seat-supports are pivoted to the spring-extension, thus imparting to the seat a swinging or rocking motion. Should the thills be constructed straight, the slightly-curved metallic block and the springs will be constructed accordingly, so as to conform with the shape of the thills.

From the foregoing description, taken in connection with the accompanying drawings, the construction and advantages of my invention will be readily understood without requiring an extended description. It will be seen that it is simple in construction, it being constructed of but comparatively few parts, is durable, and can be placed upon the market at an exceedingly low figure. This invention is also adapted for use when breaking in colts.

Having thus described my invention, I claim and desire to secure by Letters Patent of the United States—

In a two-wheeled vehicle, the combination, with the axles and thills, of the springs secured thereto, the rear ends of which are extended rearwardly and provided with transverse eyes, a seat pivotally secured at its front to thills, and the seat-supports secured to the seat at their upper ends and bent at their lower ends, forming screw-threaded extensions and provided with shoulders or collars, and nuts for securing the extensions within the eyes of the springs, substantially as set forth.

In testimony that I claim the foregoing as my own I have hereunto affixed my signature in presence of two witnesses.

ANDREW F. SHULER.

Witnesses:
   R. S. WHEELER,
   B. F. KIESTER.